United States Patent
Doms (10) Patent No.: US 9,535,935 B2
(45) Date of Patent: Jan. 3, 2017

(54) SCHEMA-BASED APPLICATION MODEL VALIDATION IN A DATABASE

(71) Applicant: Andreas Doms, Dresden (DE)

(72) Inventor: Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 14/101,135

(22) Filed: Dec. 9, 2013

(65) Prior Publication Data

US 2015/0161181 A1    Jun. 11, 2015

(51) Int. Cl.
*G06F 7/00* (2006.01)
*G06F 17/30* (2006.01)

(52) U.S. Cl.
CPC .............................. *G06F 17/30297* (2013.01)

(58) Field of Classification Search
CPC .................... G06F 17/30297; G06F 17/30292; G06F 17/30569; G06F 3/0619
See application file for complete search history.

(56) References Cited

U.S. PATENT DOCUMENTS

| | | | | |
|---|---|---|---|---|
| 5,398,336 A | * | 3/1995 | Tantry | G06F 9/465 |
| 5,546,301 A | * | 8/1996 | Agrawal | G06F 9/46 |
| | | | | 700/23 |
| 5,687,363 A | * | 11/1997 | Oulid-Aissa | G06F 17/30575 |
| 6,016,394 A | * | 1/2000 | Walker | G06F 8/30 |
| | | | | 717/104 |
| 6,237,005 B1 | * | 5/2001 | Griffin | G06F 9/5055 |
| 6,324,682 B1 | * | 11/2001 | McComb | G06F 9/4436 |
| | | | | 717/104 |
| 6,516,310 B2 | | 2/2003 | Paulley | |
| 7,222,133 B1 | * | 5/2007 | Raipurkar | G06F 11/1458 |
| | | | | 707/642 |
| 7,418,696 B2 | | 8/2008 | Hawley et al. | |
| 7,446,521 B2 | * | 11/2008 | Taurand | H02M 3/07 |
| | | | | 323/272 |
| 7,487,515 B1 | | 2/2009 | Jones et al. | |
| 7,599,947 B1 | * | 10/2009 | Tolbert | G06F 17/30917 |
| 7,721,193 B2 | | 5/2010 | Upton | |
| 7,769,726 B2 | | 8/2010 | Gitai et al. | |
| 7,886,222 B2 | | 2/2011 | Bagare et al. | |
| 7,890,476 B2 | | 2/2011 | Haham et al. | |
| 7,975,254 B2 | | 7/2011 | Gilboa | |
| 8,065,323 B2 | * | 11/2011 | Sallakonda | G06F 17/3051 |
| | | | | 707/769 |

(Continued)

OTHER PUBLICATIONS

Model-Based Run-time Verification of Software Components by Integrating OCL into Treaty, Class Wike; Software Technology Group; 1983.*

(Continued)

*Primary Examiner* — Daniel Kuddus
(74) *Attorney, Agent, or Firm* — Klarquist Sparkman, LLP (57) ABSTRACT

Technologies are provided for validating application models within a database environment. For example, an application model can be provided to a database environment and validated against a meta-schema and/or an application schema stored within the database environment. Successful validation can be required before the application model is allowed to run within the database environment (e.g., before the application model can be stored within the database environment).

15 Claims, 4 Drawing Sheets

(56) References Cited

U.S. PATENT DOCUMENTS

| | | | |
|---|---|---|---|
| 8,078,643 B2* | 12/2011 | Mush | G06F 17/30292 |
| | | | 707/802 |
| 8,352,478 B2 | 1/2013 | Buchmann et al. | |
| 8,468,491 B2 | 6/2013 | Markovic | |
| 2003/0120651 A1* | 6/2003 | Bernstein | G06F 17/30569 |
| 2004/0019586 A1* | 1/2004 | Harter | G06F 17/30607 |
| 2005/0027681 A1* | 2/2005 | Bernstein | G06F 17/30569 |
| 2005/0027714 A1* | 2/2005 | Kline | G06F 9/44505 |
| 2006/0123056 A1* | 6/2006 | Darbha | G06F 21/31 |
| 2008/0046990 A1* | 2/2008 | Narayanaswami | H04L 63/0428 |
| | | | 726/9 |
| 2009/0024551 A1 | 1/2009 | Agrawal et al. | |
| 2009/0299896 A1 | 12/2009 | Zhang et al. | |
| 2010/0131565 A1 | 5/2010 | Weinberg et al. | |
| 2010/0174687 A1* | 7/2010 | Krishnaswamy | G06F 9/44589 |
| | | | 707/690 |
| 2010/0185701 A1* | 7/2010 | Ramamurthi | G06F 17/30917 |
| | | | 707/803 |
| 2010/0293614 A1* | 11/2010 | Vilppola | G06F 21/51 |
| | | | 726/22 |
| 2012/0222003 A1* | 8/2012 | Shukla | 717/115 |
| 2014/0032715 A1* | 1/2014 | Lahcanski | G06F 17/30241 |
| | | | 709/217 |

OTHER PUBLICATIONS

Flynn, Donal et al, "Executing JSD specifications: the Specification Presentation Tool", IEEE 1990.*

* cited by examiner

SCHEMA-BASED APPLICATION MODEL VALIDATION IN A DATABASE

BACKGROUND

Software applications today are frequently based on model-driven approaches. Model-driven approaches can be applied to database systems. For example, applications can be developed for execution within a database environment. However, allowing applications to run within the database environment can be problematic, particularly in situations where the applications have access to critical database resources. For example, if an application is not coded correctly, the application can cause errors within the database environment, which can affect all users of the database environment, which may affect customers, external applications that use the database, etc.

Therefore, there exists ample opportunity for improvement in technologies related to validating application models.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for validating application models within a database environment. For example, an application model can be provided to a database environment and validated against a meta-schema and/or an application schema stored within the database environment. Successful validation can be required before the application model is allowed to run within the database environment (e.g., before the application model can be stored within the database environment).

As described herein, a variety of other features and advantages can be incorporated into the technologies as desired.

DETAILED DESCRIPTION

EXAMPLE 1

Overview

The following description is directed to techniques and solutions for validating application models within a database environment. For example, an application model can be provided to a database environment and validated against a meta-schema and/or an application schema stored within the database environment. Successful validation can be required before the application model is allowed to run within the database environment (e.g., before the application model can be stored within the database environment).

Software applications today are frequently based on model-driven approaches. For a set of software applications based on an application platform, an application schema can be defined that specifies common concepts for these applications at design time. Instances of the application schema are called application models and can be transformed into runtime models that can be executed. The runtime models are based on a runtime schema that defines which capabilities a platform supports. The meta-schema employs a formal mechanism to define how these capabilities can be described.

The technologies described herein provide advantages over existing model validation systems. For example, existing solutions may validate models outside of the database environment and may store models as objects that are not connected to their schemas. Therefore, it may be difficult or impossible to determine which schema a particular model is based on. The technologies described herein can connect models with their schemas (e.g., connect application models with their respective application schemas, meta-schemas, and/or other schemas).

As another example, the technologies described herein can provide consistency. With existing solutions, the validation algorithm may not be part of the database environment, and different validation algorithms may return different validation results. With the technologies described herein, the validation algorithms are part of the database environment (e.g., stored within the database environment) so they are available for review and evaluation (e.g., a developer or administrator can have access to the validation algorithms that were used to validate the application models).

As another example, the technologies described herein can provide versioning information. With existing solutions, models and schemas may be created and validated outside the database environment which can make it difficult or impossible to determine which version of a particular schema was used to develop a particular version of a model, etc. With the technologies described herein, an application model that has been validated against a particular application schema and/or meta-schema can be stored along with information indicating which version of the application schema and/or meta-schema is associated with the application model (e.g., which version was used in the validation). Additional information can also be stored within the database environment, such as information describing the validation (e.g., which specific validation component, validation algorithm(s), and/or validation operation(s) were used, which can include version information as well).

As another example, the technologies described herein can provide simplified validation operations. For example, because the validation can be performed within the database environment (with application models, application schemas, meta-schemas, and/or other information used for the validation also located within the database environment), data transfer outside the database environment may not be necessary. In some implementations, validation is performed entirely within the database environment and associated information (e.g., models, schemas, etc.) is stored entirely within the database environment. Furthermore, in some implementations, only one validation needs to be performed using a single validation operation to perform all needed validation operations for a particular application platform.

As another example, the technologies described herein can provide more efficient validation. For example, a parallel implementation of the validation algorithms can be provided within the database environment.

EXAMPLE 2

Meta-Schema

In any of the examples herein, a meta-schema can be provided for validating application models. The meta-schema can define constraints, such as general or basic constraints. The meta-schema can define constraints that are specific to an application platform. For example, a meta-schema that defines constraints for a financial planning application platform can define basic financial concepts such as currencies, planning and consolidation operations, etc.

A meta-schema can be stored within a database environment and used within the database environment to validate application models. For example, a validation component (e.g., comprising a validation algorithm) can validate an application model within the database environment to determine whether the application model satisfies the constraints of the meta-schema.

EXAMPLE 3

Application Schema

In any of the examples herein, an application schema can be provided for validating application models. The application schema can define application-specific constraints that are specific to an application. For example, an application schema can define constraints for a mortgage application (e.g., part of a financial planning application platform). For example, the application schema for the mortgage application can define constraints for various mortgage types, such as 30-year or 15-year mortgages, constraints for principal and interest calculations, etc.

An application schema can be stored within a database environment and used within the database environment to validate application models. For example, a validation component (e.g., comprising a validation algorithm) can validate an application model within the database environment to determine whether the application model satisfies the constraints of the application schema.

EXAMPLE 4

Application Model

In any of the examples herein, an application model can be provided that defines operations of an application. The application model can be associated with an application schema.

For example, if a developer wants to run an application within a database environment for performing mortgage calculations, the developer can create an application model for the mortgage application based on an application schema for mortgage applications. The developer can create the application model to satisfy the constraints defined by the application schema. When the developer provides the application model to the database environment, the application model can be validated against the application schema. The application model can also be validated against a meta-schema (e.g., a meta-schema defining constraints for a particular application platform covering the type of application implemented by the application schema and application model).

EXAMPLE 5

Validation

In any of the examples herein, application models can be validated within a database environment. Validation can be performed by a validation component within the database environment. For example separate validation algorithms can be provided within the database environment for each of a number of application platforms (e.g., a validation algorithm can perform validation operations that are specific to its respective application platform).

Validation can be performed using a meta-schema and/or an application schema. For example, an application model that is developed based on a specific application schema and for a specific application platform can be validated against the specific application schema and/or a meta-schema that is associated with the application platform.

In some implementations, a single validation algorithm can be provided for an application platform. The single validation algorithm can be used to perform validation for any type of application that is developed for the application platform. For example, a validation algorithm for a financial planning application platform can be used to validate any application that is developed for the financial planning application platform. For example, the validation algorithm can perform validation according to an application schema for financial planning applications (e.g., the validation algorithm can be parameterized with the application schema to validate application models developed according to the application schema). In this way, an application independent validation algorithm can be provided to validate any application developed within an application platform.

EXAMPLE 6

Database Environment

In any of the examples herein, a database environment can be provided for validating application models. For example, the database environment can be a database platform that is operated by various types of computing resources (e.g., computer servers, networking equipment, storage devices, etc.). The database environment can also be called a database platform. One example of a database environment is the HANA database platform (HANA is a database platform provided by SAP®).

For example the database environment can provide application services to users. The database can run applications based on application models. In order to run applications the database environment can require that the applications first be validated. Validation can be performed by validating application models from which the applications are generated (e.g., the application models can be transformed into runtime models and executed within the database environment).

Figure 1:
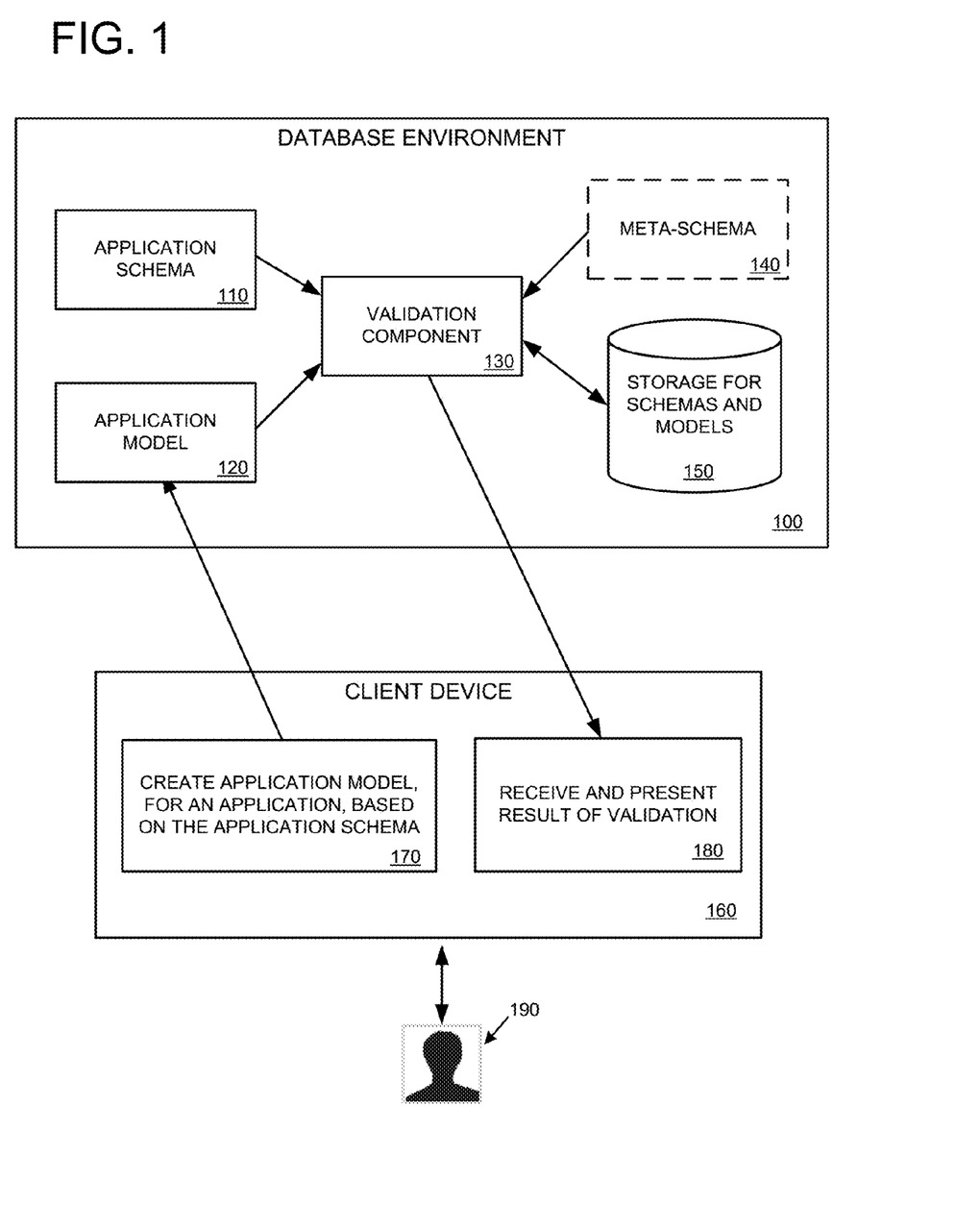
FIG. 1 is a diagram depicting an example database environment for validating application models.

FIG. 1 is a diagram depicting an example database environment 100 for validating application models. The database environment 100 can comprise various types of computing devices, such as computer servers, web servers, data storage systems, cloud computing resources, networking resources, etc.

The database environment 100 comprises a validation component 130. The validation component 130 can perform validation operations to validate application models using, at least in part, corresponding validation schemas. For example, the validation component 130 can validate application model 120 using application schema 110. In some implementations, the validation component 130 also performs validation using a meta-schema, such as meta-schema 140.

In some implementations, the validation component 130 comprises one or more validation algorithms. For example a specific validation algorithm can be created to perform all the validation operations needed to validate application models for a particular application platform (e.g., comprising a validation operation to parameterize the validation algorithm with the application schema 110 and/or with the meta-schema 140 to validate the application model 120). In this way, the validation component 130 can comprise multiple validation algorithms, each capable of validating application models for their respective application platforms.

The database environment 100 can store models and schemas (e.g., application models, application schemas, and meta-schemas) in a storage repository 150 (e.g., a database, a collection of files, and/or another type of storage repository). For example, the validation component 130 (or another component within the database environment 100) can receive application schema 110 (and optionally meta-schema 140) and store them in the storage repository 150. The validation component 130 can then receive application model 120, perform validation on the application model 120 (e.g., validate the application model 120 against the application schema 110 and/or meta-schema 140). If the application model 120 is validated (if the validation is successful), then the application model 120 can be allowed to run within the database environment 100. For example, upon successful validation, the application model 120 can be saved in the storage repository 150 (e.g., in some implementations, only successfully validated application models are saved in the storage repository 150, and for an application to be executed from an application model, the application model must be saved which ensures that it has been successfully validated).

The database environment 100 can provide results from validation performed by the validation component 130. For example, the validation component 130 (or another component of the database environment 100) can provide results of validation operations to a client device (e.g., a client device operated by a user, such as client device 160 and user 190, that submitted an application model for validation). The results of the validation can indicate whether the validation was successful (e.g., indicating that the application model will be saved within the database environment 100) or unsuccessful (e.g., indicating that the application model will not be saved within the database environment 100). The results of the validation can also comprise other information (e.g., if validation failed, the results can comprise information indicating which elements or portions of the application model failed the validation).

In some implementations, the database environment 100 ensures that only application models that have been successfully validated can operate within the database environment 100 (e.g., only validated application models can be transformed into runtime models and executed). For example, the database environment 100 can only store application models within the database environment 100 once they have been validated.

Furthermore, in some implementations the database environment 100 can ensure that information is available within the database environment to confirm that validation has been performed and to confirm how the validation was performed (e.g., to confirm which application schema, meta-schema, and/or validation algorithm was used to perform the validation). For example, by storing the application schema within the database environment with which the application model was validated, validation can be confirmed by referring back to the application schema. In order to ensure that the application schema (and in some implementations the meta-schema as well) remains available within the database environment, the database environment can prevent the application schema from being removed from the database environment (e.g., from being deleted) while any application models are still stored within the database environment that were validated against (e.g., that are associated with) the application schema (and in some implementations, for the meta-schema as well.

FIG. 1 also depicts a client device 160. The client device 160 can be any type of client computing device. For example, the client device 160 can be a desktop or laptop computer, a mobile computing device (e.g., a mobile phone or tablet computing device), or another type of computing device. The client device 160 is operated by a user 190.

The client device 160 can be used to create application models based on application schemas in order to run corresponding applications within the database environment 100. As depicted at 170, an application model is created and uploaded to the database environment 100 (depicted as application model 120). For example, the application model 120 can be created by the user 190 (e.g., an application developer creating applications within a business or organization).

Once validation has been performed for the application model 120 (e.g., by the validation component 130) within the database environment 100, results of the validation can be provided to the client device 160 and presented to the user 190 (as depicted at 180). For example, the results can inform the user 190 that the application model 120 has been successfully validated or that the application model 120 has failed validation. Upon failed validation, the results can also indicate to the user 190 the specific validation errors (e.g., which elements or portions of the application model 120 failed the validation).

The database environment 100 can be accessed by any number of client device and/or users, such as client device 160 and associated user 190. For example, the database environment 100 can provide database services, including running applications, for users and/or customers of a business or organization.

EXAMPLE 7

Methods for Validating Application Models

Figure 2:
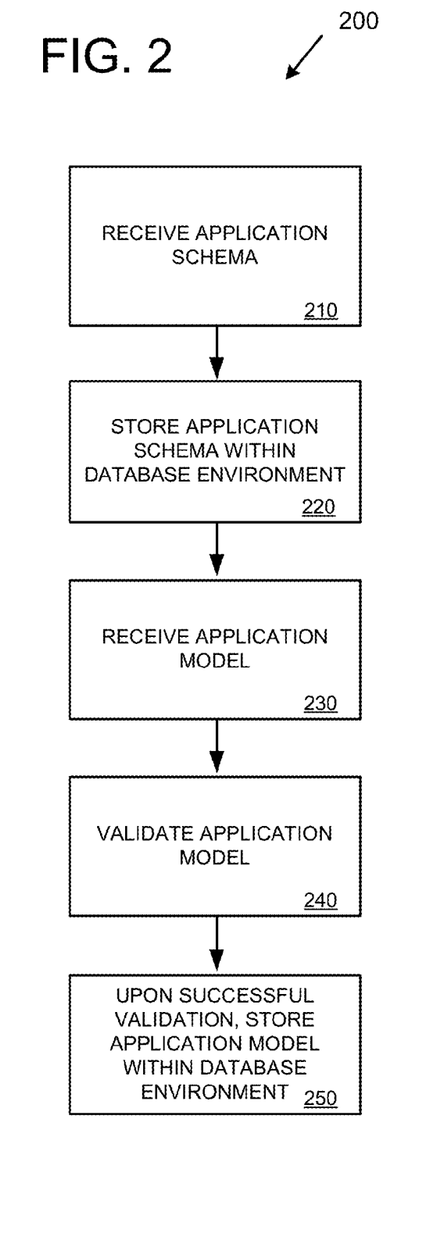
FIG. 2 is a flowchart of an example method for validating application models within a database environment.

In any of the examples herein, methods can be provided for validating application models within a database environment. FIG. 2 is a flowchart of an example method 200 for validating application models within a database environment. The example method 200 can be performed, at least in part, by a database environment (e.g., by database environment 100 depicted in FIG. 1).

At 210, an application schema is received by the database environment. For example, the application schema can define constraints for validating application models that are associated with the application schema. As depicted at 220, the application schema is stored within the database environment.

At 230, an application model is received. For example, the application model can define operation of an application (e.g., an application that will be executed by the database environment if the application model is transformed into a runtime model that is then executed by a runtime platform of the database environment).

At 240, the application model is validated against the application schema. The validation can be performed within the database environment. In some implementations, the application model is also validated against a meta-schema. For example, a validation component (e.g., comprising a validation algorithm) can perform the validation to determine whether the application model is consistent with the application schema and/or meta-schema (e.g., whether the application model satisfies all of the constraints defined by the application schema and/or meta-schema).

At 250, the application model is stored within the database environment upon successful validation. In some implementations, the application model is stored within the database environment only after it has been successfully validated. Furthermore, the database environment can require successful validation before an application model is allowed to run within the database environment.

Figure 3:
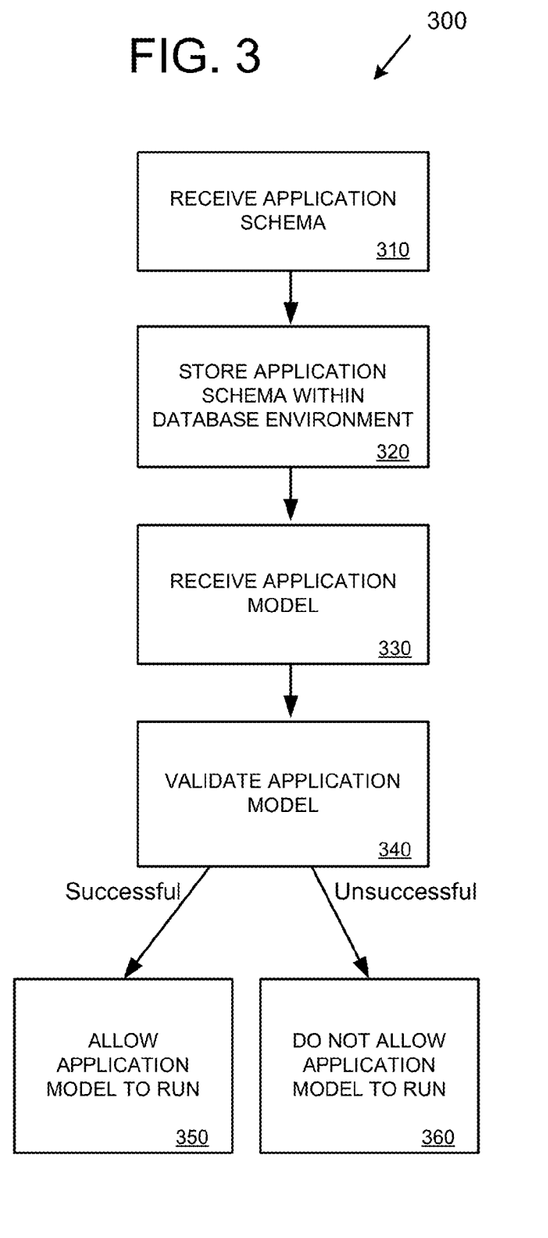
FIG. 3 is a flowchart of an example method for validating application models within a database environment.

FIG. 3 is a flowchart of another example method 300 for validating application models within a database environment. The example method 300 can be performed, at least in part, by a database environment (e.g., by database environment 100 depicted in FIG. 1).

At 310, an application schema is received by the database environment. For example, the application schema can define constraints for validating application models that are associated with the application schema. As depicted at 320, the application schema is stored within the database environment.

At 330, an application model is received. For example, the application model can define operation of an application (e.g., an application that will be executed by the database environment if the application model is transformed into a runtime model that is then executed by a runtime platform of the database environment).

At 340, the application model is validated against the application schema. The validation can be performed within the database environment. In some implementations, the application model is also validated against a meta-schema. For example, a validation component (e.g., comprising a validation algorithm) can perform the validation to determine whether the application model is consistent with the application schema and/or meta-schema (e.g., whether the application model satisfies all of the constraints defined by the application schema and/or meta-schema).

If the validation of the application model is successful, the method proceeds to 350, where the application model is allowed to run within the database environment. In some implementations, the application model is saved within the database environment upon successful validation and only application models that have been saved within the database environment are allowed to run within the database environment. Results can also be provided indicating that validation was successful (e.g., the results can be saved to a file, provided to a client device for display to a user, emailed, or otherwise output).

If the validation of the application model is unsuccessful, the method proceeds to 360, where the application model is not allowed to run within the database environment. In some implementations, the application model is not saved within the database environment when the validation is unsuccessful. A result of the validation can also be output that indicates the application model cannot be run within the database environment. The result can also indicate reasons that the validation failed. The result can be saved to a file, provided to a client device for display to a user, emailed, or otherwise output.

In some implementations, validation of application models is performed entirely within the database environment. For example, the methods depicted in FIGS. 2 and 3 can be performed entirely within the database environment to validate application models. Once validated, the database environment can execute applications based on the validated models (e.g., transform the validated models into runtime models that are executed within a runtime environment of the database environment).

EXAMPLE 8

Detailed Database Environment

In any of the examples herein, a database environment can be provided comprising various components for validating application models and running applications based on the validated application models. For example, the database environment can be a database platform that is operated by various types of computing resources (e.g., computer servers, networking equipment, storage devices, etc.). The database environment can also be called a database platform.

Figure 4:
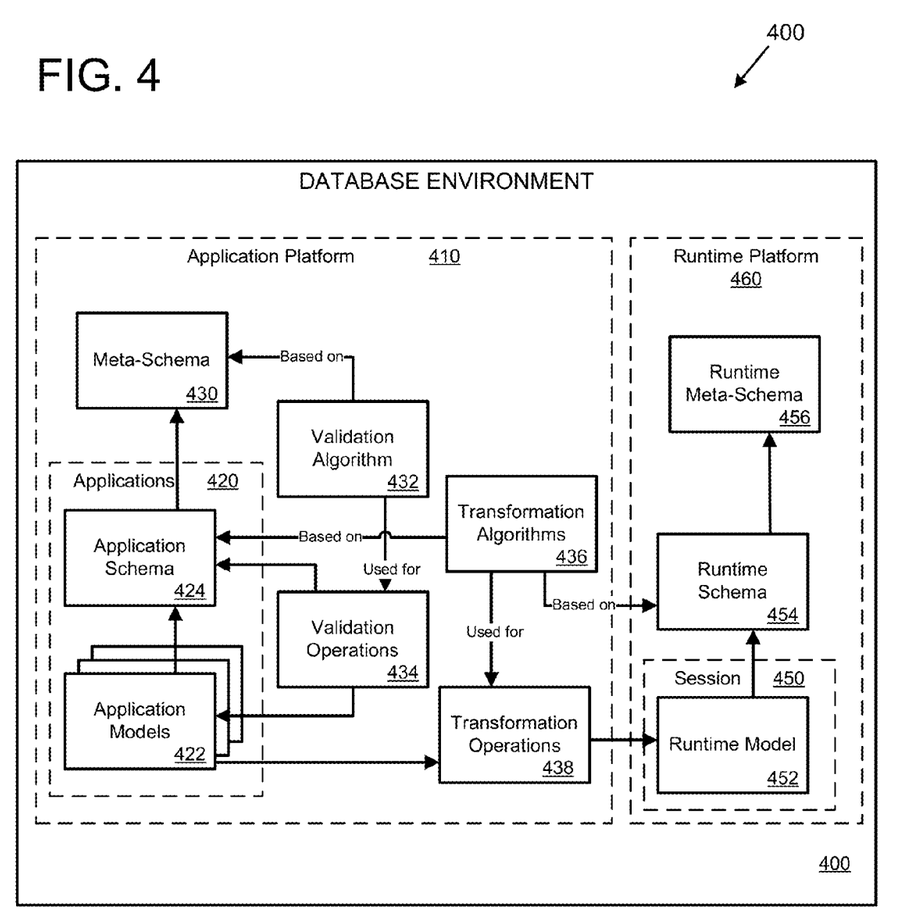
FIG. 4 is a diagram depicting an example database environment for validating application models and running applications.

FIG. 4 is a diagram depicting a specific implementation of a database environment 400 for validating application models and running applications based on the validated application models. The database environment 400 can comprise various types of computing devices, such as computer servers, web servers, data storage systems, cloud computing resources, networking resources, etc.

The database environment 400 supports different application platforms, including application platform 410. For example, the application platform 410 can be a financial planning platform or a spatial application platform. The database environment 400 can support an arbitrary number of application platforms.

The application platform 410 includes a meta-schema 430. The meta-schema 430 defines concepts and basic constraints of the application platform 410. For example, if the application platform 410 is a financial planning platform, then the meta-schema 430 can define basic financial concepts and constraints.

Using the application platform 410, applications 420 can be defined. Applications are defined by an application schema 424 and application models 422. The application schema 424 defines application-specific constraints. For example, an application developer (not pictured) can develop an application model based on the application schema 424 and upload the application model 422 to the database environment 400.

The application platform 410 also includes a validation algorithm 432. The validation algorithm 432 performs validation operations 434 to validate the application models 422 based on the constraints defined by the meta-schema 430 and/or the application schema 424. For example, the validation operations 434 can comprise a validation operation that parameterizes the validation algorithm 432 with the application schema 424 to validate the application models 422.

The application platform 410 also includes a transformation algorithm 436. The transformation algorithm 436 transforms, using transformation operations 438, a validated application model 422 into a runtime model 452 that can be executed on the runtime platform 460. The runtime platform 460 can execute the runtime model 452 in a session 450 using a runtime schema 454 and the runtime meta-schema 456 (e.g., a runtime version of the meta-schema that defines runtime computational concepts provided by the database environment).

EXAMPLE 9

Example Embodiment

This section defines an example embodiment of the technologies described herein. In the example embodiment, a database runs complex algorithms directly on the data stored in the tables instead of transferring it to an external application server. These complex algorithms can be used with various application domains. Example complex algorithms can include spatial algorithms, scheduling algorithms, optimization algorithms, and planning algorithms. These complex algorithms can be used in different application domains. For example, scheduling algorithms can be used to optimize workforce planning or to optimize demand and supply. Planning algorithms can be used for financial allocation, consolidation, and other planning applications.

Typically these complex algorithms require low level database access to run efficiently on the given hardware, and database users are not allowed to add or change these algorithm implementations to protect the integrity of the database. Database users have access to these algorithms only indirectly. The user provides the data in the database as tables or other data artifacts. The user then defines how the output is stored and specifies which algorithm should run over the data.

The algorithm implementations are unaware of the application domain specifics. For example spatial algorithms can be used to run a geo-spatial application to compute the size of a geographic area or they can be used to compute the surface of a facade of a building. Planning algorithms can be used for financial planning or planning for supply and demand.

The specifics of an application domain are modeled in the meta-schema of the application platform. For example a financial planning platform may define concepts such as currencies, amounts of money, and planning and consolidation operations. Another example may be a spatial application platform that defines concepts such as 2D and 3D nodes and edges, distances, and areas in-between.

The validation algorithm is based on the meta-schema. Each application-platform has its own validation algorithm. A validation operation can be used to parameterize the validation algorithm with an application schema and execute it. The operation returns true if a given application model adheres to the application schema. For example a geospatial application schema may model streets and borders as edges and cities and junctions as nodes. The application model may only use those concepts that are defined in the application-schema.

The meta-schema defines concepts and basic constraints. An example of a meta-schema constraint is a constraint to not allow modeling of an area with less than 3 points. In another case the meta-schema of an application platform may define a constraint that demand must have a negative sign, and the sum of demand and supply must be zero over a specific time interval.

An application-schema defines application specific constraints. For example a geospatial application may define that countries be modeled by a non-empty set of areas, and that countries have a unique name.

In another example the meta-schema of a planning application-platform may define the concept of planning steps, input and output of such steps, and the concept of partially ordered steps. An application schema of this planning platform may define that each planning step takes as input database tables and the output of any previous step. An instance of this application schema, an application model, may now define a specific planning method based on two steps, defining that step 2 takes the output of step 1 as an input. If this application model uses a concept that is not defined in the meta-schema, validation would fail. Also if the application model were to define that step 1 takes as input the result of step 2 (modeling a circular dependency), validation would fail.

An application schema is bundled with a transformation algorithm. The transformation algorithm transforms an application model into a runtime model that can be executed on the runtime platform. It translates the concepts used in the application model into basic concepts defined by the meta-schema in a representation that the algorithms implemented within the runtime platform can perform meaningful computations. For example cities and streets can be transformed into nodes and edges in a representation such that the runtime platform can compute distances.

EXAMPLE 10

Scenarios

This section describes a simplified example scenario to illustrate the concepts described herein. Note that the simplified example described in this section is intended to illustrate the concepts described herein, and may not be a fully defined or working example.

First, an example meta-schema is provided. The example meta-schema defines a number of concepts related to customers and ordering, as follows.

The example meta-schema defines the concept of a customer.

E.g., has name, sends an order, receives invoices

The example meta-schema defines the concept of an order.

E.g., allocates resources, has price and tax info

The example meta-schema defines the concept of an invoice.

E.g., is associated with an order and a customer

The example meta-schema defines the concept of a resource.

E.g., may be restricted to a limited number of allocations per time interval

The example meta-schema, as defined by the above concepts, is presented below in XML format. In general, the example meta-schema, as well as the other example schemas and models described in this section, can be defined using languages other than XML (e.g., XML Schema Definition (XSD), JavaScript Object Notation (JSON), etc.).

```xml
<?xml version="1.0" encoding="UTF-8"?>
<schema namespace="http://www.platfrom.com/CRM">
    <complexType name="Customer">
        <attribute name="ID" unique="true"/>
        <attribute name="name" type="string" />
        <attribute name="orders" type="sequence of Orders" />
        <attribute name="invoices" type="sequence of Invoices" />
    </complexType>
    <complexType name="Order">
        <attribute name="allocates" type="Resource" />
        <attribute name="price" type="number" />
        <attribute name="tax" type="number" />
    </complexType>
    <complexType name="Invoice">
        <attribute name="orders" type="sequence of Orders" min=1 />
        <attribute name="customer" type="Customer" min=1 max=1 />
    </complexType>
    <complexType name="Resource">
        <attribute name="timeslots" type="sequence of non-overlapping time intervals" />
        <attribute name="allocations" type="sequence of resources"/>
    </complexType>
</schema>
```

Second, an example application schema is presented. The example application schema defines concepts that can be used to create example restaurant applications. Specifically, the example application schema defines the following concepts.

The example application schema defines the concept of a restaurant guest:
  Based on meta concept customer
  May be a single person or group, with preferences
The example application schema defines the concept of a restaurant order:
  Based on meta concept resource
  Associated with a table
The example application schema defines the concept of a restaurant bill:
  Based on meta concept invoice
  Is associated with an order
The example application schema defines the concept of a table in a restaurant:
  Based on meta concept resource
  May have a location in the restaurant room
  Can be reserved only once per time interval
The example application schema defines the concept of a waiter:
  Based on concept resource
  Can only serve a limited number of customers at a time The example application schema, as defined by the above concepts, is presented below in XML format.

```xml
<?xml version="1.0" encoding="UTF-8"?>
<schema namespace="http://www.platfrom.com/Restaurant">
    <complexType name="Restaurant">
        <element name="Guests" type="sequence of customers" />
        <element name="Orders" type="sequence of Orders" />
        <element name="Bills" type="sequence of Invoives" />
        <element name="Tables" type="sequence of Tables" min=1 />
    </complexType>
    <complexType name="Table" basedOn="Resource" >
        <attribute name="location" type="XYposition"/>
        <attribute name="seats" type="number" />
        <attribute name="reservations" type="sequence of Reservations" />
    </complexType>
    <complexType name="Guest" basedOn="Customer"> ... </complexType>
    <complexType name="Order" basedOn="Order"> ... </complexType>
    <complexType name="Bill" basedOn="Invoive"> ... </complexType>
    <complexType name="Waiter" basedOn="Resource"> ... </complexType>
    <complexType name="Reservation" basedOn="Resource"> ...
    </complexType>
</schema>
```

The example application schema described above can be used when performing validation of an application model that uses the application schema. For example, validation can be performed to ensure that the application model conforms to the application schema (e.g., only uses XML elements defined in the application schema, which in this example would be Restaurant, Guests, Orders, Bills, Tables, etc.) and/or the meta-schema (e.g., the example meta-schema above defines a Customer type upon which other types can be based, such as the Guest type in the example application schema).

Third, an example application model is presented. The example application model describes a specific application (or instance) that is based on the application schema above. Specifically, the below application model describes an application for a specific restaurant, named "Seafood Restaurant."

The example application model defines 3 tables, with a different number of seats located in different rooms, or locations, of the restaurant. The example application model defines a variable number of waiters (the application may assign waiters to tables and/or guest dynamically). In the example application model, orders are taken by waiters and queued to be processed by the kitchen and are stored in a database table. Also, in the example application model, bills are generated automatically and are stored in a database table. The example application model is defined in XML below.

```xml
<?xml version="1.0" encoding="UTF-8"?>
<Restaurant name="Seafood restaurant">
    <Tables>
        <Table id=1 x=1 y=3 seats=6 />
        <Table id=2 x=5 y=9 seats=10 />
        <Table id=3 x=4 y=14 seats=15 />
    </Tables>
    <Guests dbTable="..." />
    <Orders dbTable="..." />
    <Bills dbTable="..." />
    <Waiters>
        <Waiter id=1 name="..." />
        <Waiter id=2 name="..." />
    </Waiters>
</Restaurant>
```

The example application model described above can be validated using the example application schema and/or the meta-schema. For example, the Table elements of the application model can be checked to ensure that the Table elements only use defined tags (x/y position, seats, and reservations according to the example application schema). As another example, the example application model can be checked to make sure that the Seafood Restaurant includes at least one Table (as defined by the application schema).

Validation can be performed using the above example meta-schema, application schema, and application model. For example, a validation component (e.g., a validation component running within a database platform) can perform validation operations (e.g., using various validation algorithms) according to the meta-schema and the application schema in order to validate an application model. The validation component can be programmed using any programming language.

For example, the validation component (e.g., comprising one or more validation algorithms) can validate the constraints defined by the meta-schema (e.g., all constraints defined by the meta-schema). The validation component can further be parameterized with the application schema. The validation component can then take as input the application model. The validation component can then perform the validation of the application model according to the meta-schema and the application schema. If there are no validation errors (e.g., if the validation algorithms report that there are no errors), then the application model can be validated successfully, indicating that the application model adheres to (e.g., is consistent with) the meta-schema and the application schema. Additional validation can also be performed (e.g., that is not explicitly defined in the meta-schema or application schema), such as basic constraints checking (e.g., checking minimum and maximum values).

The application-schema itself can also be validated (e.g., using other validation algorithms).

In some implementations, the application schema and the application model are stored in the database. In some implementations, the database will not allow an application schema to be deleted so long as there is at least one application model in the database that refers to it (e.g., that has been validated against the application schema).

EXAMPLE 11

Computing Systems

Figure 5:
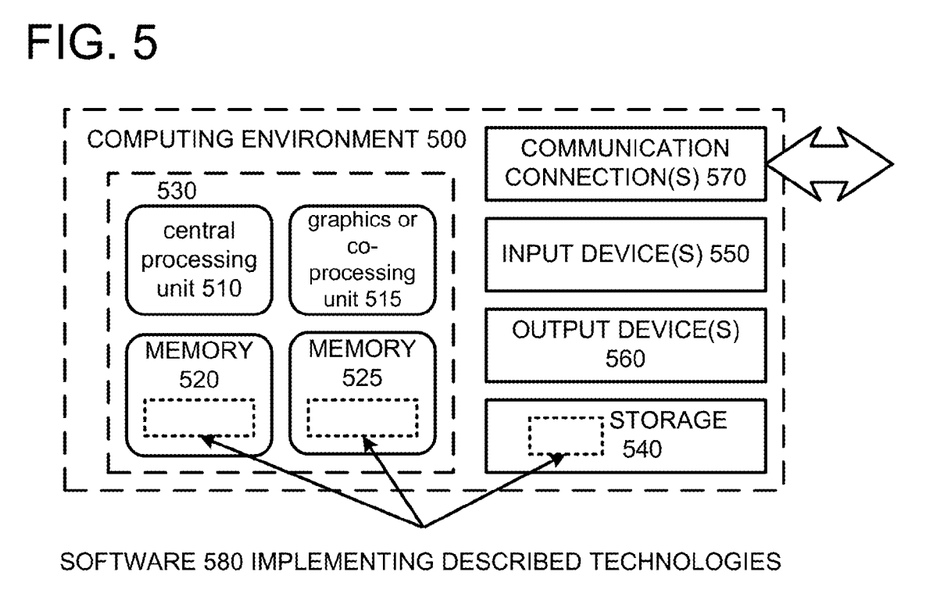
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 12

Cloud Computing Environment

Figure 6:
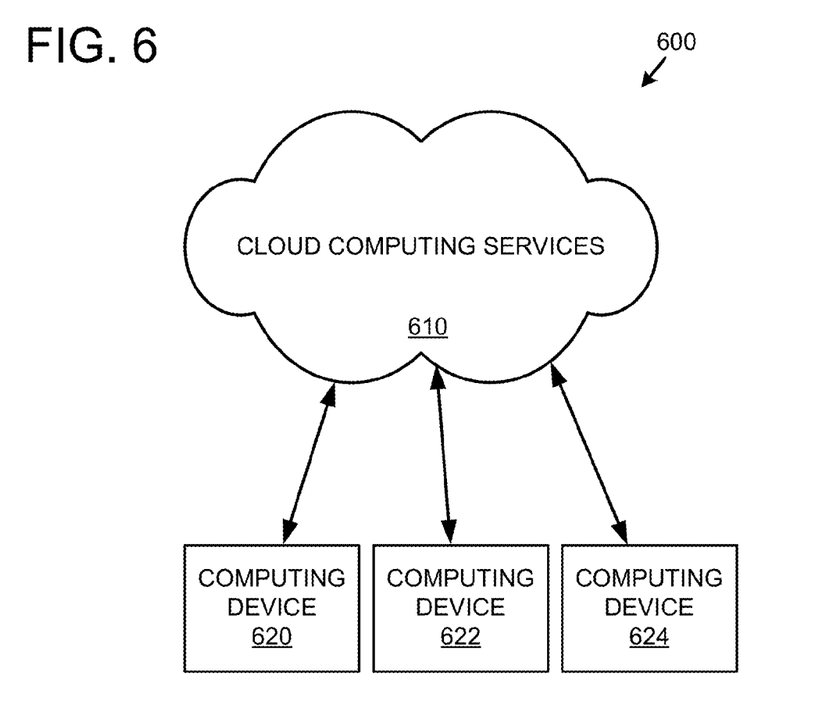
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

EXAMPLE 13

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections (e.g., 570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by a computing device, for validating application models within a database environment, the method comprising: receiving an application schema, wherein the application schema defines constraints for validating application models that are associated with the application schema;
storing the application schema within the database environment;
receiving an application model, wherein the application model defines operation of an application, and wherein the application model is associated with the application schema;
validating the application model, wherein the validating comprises performing validation of the application model against the application schema;
upon successful validation of the application model, storing the application model within the database environment, wherein validation is successful when the application model satisfies all constraints of the application schema, wherein a constraint is satisfied when the constraint is consistent with the application model; and
when the validation of the application model is unsuccessful, outputting a result of the validation that indicates the application model will not be stored within the database environment, wherein validation is unsuccessful when the application model fails at least one constraint of the application schema;
wherein the application schema remains available within the database environment, and cannot be removed from the database environment, while there are any application models stored within the database environment that are associated with the application schema and that were validated against the application schema, wherein the application schema remains available for review and evaluation within the database environment.

2. The method of claim 1, wherein the application schema defines one or more application-specific constraints, and wherein the validating comprises determining whether the application model satisfies the one or more application-specific constraints defined by the application schema.

3. The method of claim 2, further comprising:
outputting a result of the validation;
wherein the result of the validation comprises an indication of whether the application model satisfies the one or more application-specific constraints defined by the application schema.

4. The method of claim 1, wherein successful validation of the application model is required before the application model is transformed into a runtime model and executed within the database environment.

5. The method of claim 1, further comprising:
receiving a meta-schema, wherein the meta-schema defines constraints for an application platform, wherein the application model is associated with the application platform, wherein the constraints of the application platform are specific to the application platform;
wherein validating the application model further comprises performing validation of the application model against the meta-schema.

6. The method of claim 5, wherein the meta-schema defines one or more general constraints related to the application platform, and wherein the validating comprises determining whether the application model satisfies the one or more general constraints defined by the meta-schema.

7. The method of claim 1, further comprising:
determining a version of the application schema to which the application model is validated against; and
storing, in the database environment, the version of the application schema in association with the application model.

8. A database environment comprising:
one or more computer servers; and
one or more databases;
the database environment configured to perform operations for validating application models, the operations comprising:
receiving an application schema, wherein the application schema defines constraints for validating application models that are associated with the application schema;
storing the application schema within the database environment;
receiving an application model, wherein the application model defines operation of an application, and wherein the application model is associated with the application schema;
validating the application model, wherein the validating comprises performing validation of the application model against the application schema;
when the validating the application model is successful:
transforming the application model into a runtime model for execution within the database environment and storing the application model within the database environment; and
when the validating the application model is unsuccessful:
outputting a result of the validation that indicates the application model cannot be run within the database environment;
wherein validation is successful when the application model satisfies all constraints of the application schema, wherein a constraint is satisfied when the constraint is consistent with the application model, and wherein validation is unsuccessful when the application model fails at least one constraint of the application schema;
wherein the application model is stored within the database environment only when the application model has been successfully validated;
wherein the application schema remains available within the database environment, and cannot be removed from the database environment, while there are any application models stored within the database environment that are associated with the application schema and that were validated against the application schema.

9. The database environment of claim 8, the operations further comprising:
receiving a meta-schema, wherein the meta-schema defines constraints for an application platform, wherein the application model is associated with the application platform;
wherein validating the application model further comprises:
performing validation of the application model against the meta-schema.

10. The database environment of claim 9, wherein the meta-schema defines one or more general constraints related to the application platform, and wherein the validating comprises determining whether the application model satisfies the one or more general constraints defined by the meta-schema.

11. The database environment of claim 8, wherein the application schema defines one or more application-specific constraints, and wherein the validating comprises determining whether the application model satisfies the one or more application-specific constraints defined by the application schema.

12. The database environment of claim 8, the operations further comprising:
when the validating the application model is successful:
storing information within the database environment indicating that the application model has been successfully validated against the application schema.

13. A computer-readable storage medium storing computer-executable instructions for causing a computing device to perform a method for validating application models within a database environment, the method comprising:
receiving an application schema, wherein the application schema defines one or more application-specific constraints for validating application models that are associated with the application schema;
storing the application schema within the database environment;
receiving an application model, wherein the application model defines operation of an application, and wherein the application model is associated with the application schema;
validating the application model, wherein the validating comprises determining whether the application model satisfies the one or more application-specific constraints defined by the application schema, wherein validation is successful when the application model satisfies all of the one or more application-specific constraints defined by the application schema, wherein a constraint is satisfied when the constraint is consistent with the application model;

upon successful validation of the application model, storing the application model within the database environment, wherein successful validation of the application model is required before the application model is stored within the database environment, and wherein successful validation of the application model is required before an application based on the application model is executed within the database environment; and when the validation of the application model is unsuccessful, outputting a result of the validation that indicates the application model will not be stored within the database environment, wherein validation is unsuccessful when the application model fails at least one of the application-specific constraints defined by the application schema;

wherein the application schema remains available within the database environment, and cannot be removed from the database environment, while there are any application models stored within the database environment that are associated with the application schema and that were validated against the application schema.

14. The computer-readable storage medium of claim 13, wherein validating the application model comprises:

parameterizing an application independent validation algorithm with the application schema.

15. The computer-readable storage medium of claim 13, the method further comprising:

receiving a meta-schema, wherein the meta-schema defines constraints for an application platform, wherein the application model is associated with the application platform;

wherein validating the application model further comprises:

performing validation of the application model against the meta-schema.

* * * * *